Patented Nov. 6, 1951

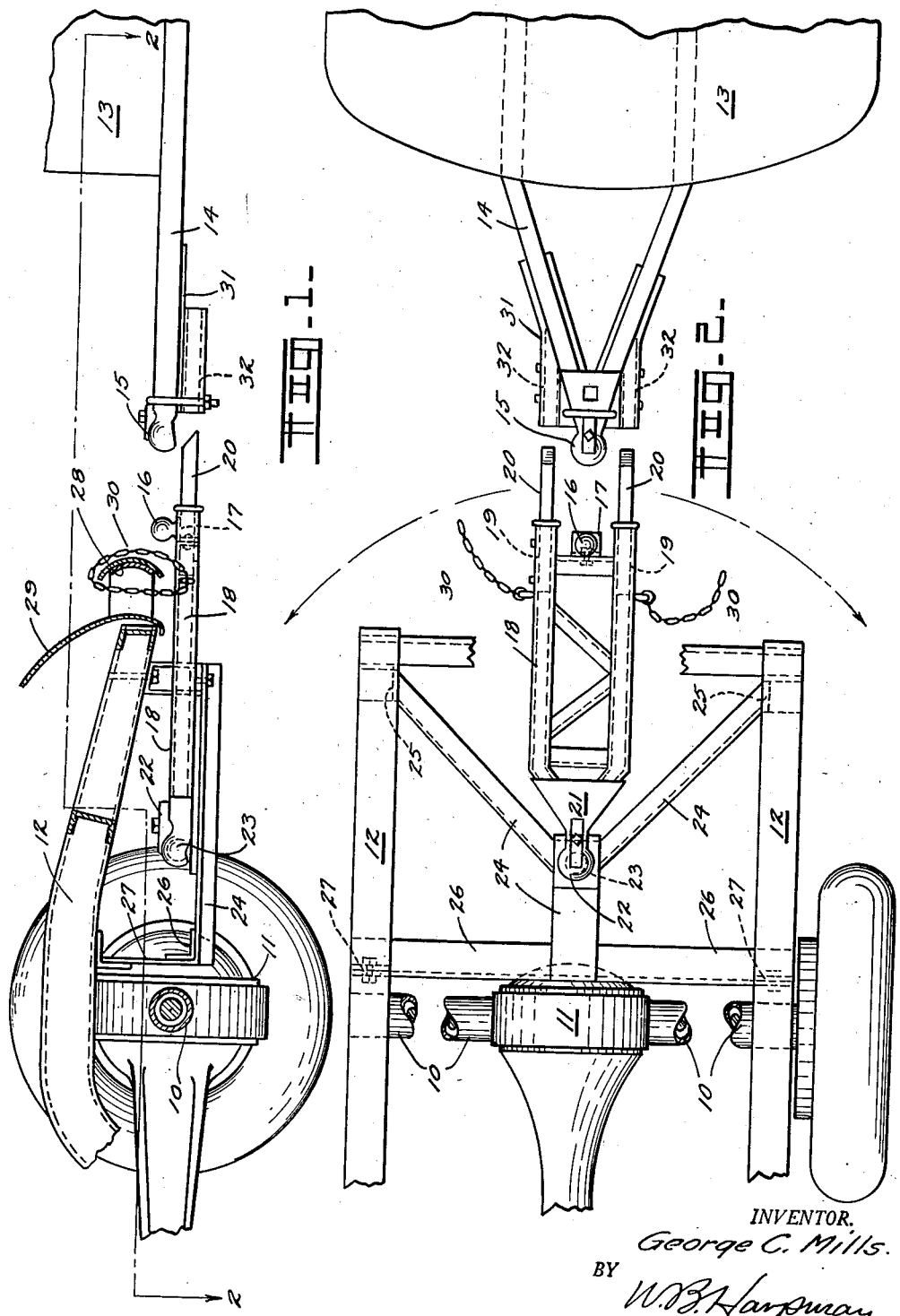

2,574,276

UNITED STATES PATENT OFFICE 2,574,276

TRAILER HITCH

George C. Mills, Youngstown, Ohio, assignor of fifty per cent to Harry A. Makin, Sr., Johnstown, Pa.

Application August 3, 1950, Serial No. 177,409

5 Claims. (Cl. 280—33.44)

1

This invention relates to a trailer hitch and more particularly to a tow bar detachably secured to a vehicle and to a trailer such as a house trailer and the like.

The principal object of the invention is the provision of a trailer hitch incorporating a tow bar detachably secured to a vehicle and a trailer to be towed thereby.

A further object of the invention is the provision of a trailer hitch incorporating means for supporting the trailer load upon the frame of the towing vehicle.

A still further object of the invention is the provision of a trailer hitch incorporating a frame-like attachment for a towing vehicle and a detachably secured towing bar pivotally mounted thereon and providing a separable connection for the trailer at a convenient point with respect to the towing vehicle.

A still further object of the invention is the provision of a trailer hitch incorporating telescopically engaging guide members facilitating the attachment of the towing vehicle to the trailer.

A still further object of the invention is the provision of a trailer hitch incorporating a tow bar which may be removed from the towing vehicle or, alternately, carried thereby when not connected with a trailer.

The trailer hitch disclosed herein comprises an improvement in the art of trailer hitches in general in that a construction is disclosed which may be attached directly to the frame portions of the towing vehicle and which provides a removable tow bar pivotally mounted on the vehicle and extending beyond the rearmost portion thereof and providing means for establishing a secure yet detachable connection with a trailer to be towed.

The device incorporates means facilitating the ready attachment of the tow bar to the trailer in the form of telescopically engaging guide members which become structural supporting portions of the tow bar and trailer when the same is in connection therewith. The device enables the towing bar to swing in a wide arc with respect to its pivotal mounting on the towing vehicle and thereby facilitates the towing of the trailer as well as the connection and disconnection of the same therefrom. The device is capable of economic manufacture and relatively easy installation upon any vehicle and trailer.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein:

Figure 1 is a side elevation with parts broken away and parts in cross section illustrating a portion of a towing vehicle and a portion of a trailer and the trailer hitch positioned therebetween.

Figure 2 is a top plan view of the device illustrated in Figure 1.

By referring to the drawings and Figure 1 in particular it will be seen that a rear axle of a towing vehicle is indicated by the numeral 10, the differential housing thereon by the numeral 11 and the frame of the towing vehicle by the numerals 12—12. A trailer such as a house trailer is generally indicated by the numeral 13 and the forwardly extending frame thereof by the numeral 14. It will be observed that as is customary in the art the frame 14 of the house trailer 13 is shaped so that the foremost ends thereof converge toward one another and are joined together and provided with a coupling 15. The coupling 15 forms a socket engageable with a ball secured to the towing vehicle.

It will be recognized by those skilled in the art that the ball portion of the coupling 15 is usually secured directly to the towing vehicle. However, in the present disclosure the ball is indicated by the numeral 16 and is secured by means of an adjustable bracket 17 to a tow bar 18. The tow bar 18 includes a pair of spaced frame members preferably tubular and provide longitudinally extending sockets 19—19 for the reception of a pair of guide pins 20—20, portions of which normally project beyond the end of the tow bar 18. The opposite end of the tow bar 18 is provided with a triangular frame piece 21 which carries a secondary trailer coupling 22 engageable with a ball 23 which in turn is positioned at the apex of a Y-shaped frame 24 located beneath the towing vehicle.

The arms of the Y-shaped frame 24 are provided with vertical sections 25 which are bolted to the rearmost portions of the frame 12 of the towing vehicle. The base of the Y-shaped frame 24 is secured to a cross piece 26, the ends of which are provided with vertical sections 27 and secured to the frame members 12 of the towing vehicle at points thereon near the transverse plane of the rear axle 10. It will thus be seen that the Y-shaped frame 24 is disposed on a horizontal plane beneath the frame 12 of the towing vehicle and on approximately the same horizontal plane as the rear axle 10 of the towing vehicle. It will also be seen that is located below the lowermost portion of the overhanging portion of the tow vehicle; for example, the bumpers, fenders, etc., thereof. In Figure 1 of the drawings the bumper of the towing vehicle is indicated by the numeral 28 and a portion of one of the rear fenders is indicated by the numeral 29.

It will be observed that the tow bar 18 pivoted on the ball 23 at the apex of the Y-shaped frame 24 is thereby free to swing in a horizontal radius limited only by the upright end sections 25 on the arms of the frame 24 and thereby enabling the tow bar to be attached to a trailer with the towing vehicle in many and various positions and to facilitate the towing and turning of the trailer particularly when sharp turns are negotiated.

In Figure 1 of the drawings the tow bar 18 is shown provided with a chain 30. The chain 30 is preferably attached at each side of the tow bar 18 and adapted to be looped over the bumper 28 of the towing vehicle so as to hold the tow bar 18 in approximately horizontal position at such time as it is not attached to the trailer. Alternately the tow bar 18 may be removed from the towing vehicle by operating the coupling 22 so as to release the same from the ball 23.

It will thus be seen that an efficient extension of the actual coupling point for a trailer with respect to a towing vehicle has been disclosed in the tow bar 18 and its connection to the towing vehicle through the frame 24.

The frame 14 of the trailer, as seen in Figures 1 and 2 of the drawings, is provided at its foremost end with an adapter which may be bolted, welded or otherwise secured thereto and which adapter comprises a body member 31 including a pair of longitudinally extending sockets 32—32 which are spaced with respect to one another and correspond with the spacing of the guide pins 20—20. In the drawings, the body member 31 is shown positioned partially beneath the frame 14 and it will occur to those skilled in the art that this positioning may be altered if desired so that the longitudinal sockets 32—32 may lie on the same plane as the frame 14 or above the same, such positioning being a matter of choice and will obviously be different in various makes of trailers wherein the frames are of different height and thicknesses and located at different heights above the average ground surface.

In the present invention the sockets 32 are intended to receive the guide pins 20—20 and it will be observed by those skilled in the art that when the towing vehicle has been backed into position such as shown in Figures 1 and 2 of the drawings, the guide pins 20—20 may be manually moved outwardly of their telescopic engagement in the sockets 19 of the tow bar 18 and partially engaged in the sockets 32 of the body member 31. The towing vehicle may then be backed up until the guide pins are fully telescoped with both the sockets 19 and 32 at which time the coupling 15 will register with the ball 16 on the tow bar 18, as heretofore described, and the actual coupling of the trailer may then be made.

It will thus be seen that the tow bar 18 is secured to the frame 14 of the trailer by the engagement of the guide pins 20—20 and the engagement of the coupling 15 on the ball 16 with the result that the tow bar 18 becomes, in effect, an extension of the trailer frame 14 capable of supporting the weight thereof and at the same time insuring a tight coupling incapable of being accidentally disengaged. The chain 30 may be removed at this point as the same has been in position over the bumper 28 of the towing vehicle as the weight of the frame 14 and the tow bar 18 will then be carried by the coupling 22 on the ball 23 of the Y-shaped frame 24 which is secured to the frame 12 of the towing vehicle.

It will thus be seen that the several objects of the invention have been met by the trailer hitch disclosed herein.

Having thus described my invention, what I claim is:

1. The combination with a motor vehicle having a driving axle and a chassis frame extending in rear of said axle, of a trailer hitch comprising a Y-shaped frame secured to said chassis frame and lying on a horizontal plane therebeneath, a tow bar detachably coupled at one end to said Y-shaped frame at the apex thereof and extending beyond said motor vehicle, a pair of longitudinally extending sockets formed in the outermost end of the said tow bar, a coupler ball mounted on said tow bar near the outermost end thereof and guide pins movably positioned in said sockets and extending outwardly therefrom, a body member adapted to be attached to a trailer frame having a coupling element thereon, a pair of secondary longitudinally extending sockets formed in said body member arranged for registry with the said guide pins, the coupling element on the trailer frame adapted to register with the said coupler ball on said tow bar when the said guide pins are in telescopic engagement in the said sockets and secondary sockets.

2. The combination with a motor vehicle having a driving axle and a chassis frame extending in rear of said axle, of a trailer hitch comprising a Y-shaped frame secured to said chassis frame and lying on a horizontal plane therebeneath, a tow bar detachably coupled at one end to said Y-shaped frame and extending beyond said motor vehicle, a longitudinally extending socket formed in the outermost end of the said tow bar, a coupler ball mounted on said tow bar near the outermost end thereof and a guide pin movably positioned in said socket and extending outwardly therefrom, a body member adapted to be attached to a trailer frame having a coupling element thereon, a secondary longitudinally extending socket formed in said body member arranged for registry with the said guide pin, the coupling element on the trailer frame adapted to register with the said coupler ball on said tow bar when the said guide pin is in telescopic engagement in the said socket and secondary socket.

3. The combination with a motor vehicle having a driving axle and a chassis frame extending in rear of said axle, of a trailer hitch comprising a Y-shaped frame secured to said chassis frame and lying on a horizontal plane therebeneath, a coupler ball positioned on the said Y-shaped frame at the apex thereof, a tow bar detachably coupled at one end to said coupler ball and extending beyond said motor vehicle, a longitudinally extending socket formed in the outermost end of the said tow bar, a pivot ball mounted on said tow bar near the outermost end thereof and a guide pin movably positioned in said socket and extending outwardly therefrom, a body member adapted to be attached to a trailer frame having a coupling element thereon, a secondary longitudinally extending socket formed in said body member arranged for registry with the said guide pin, the coupling element on the trailer frame adapted to register with the said pivot ball on said tow bar when the said guide pin is in telescopic engagement in the said socket and secondary socket.

4. The trailer hitch defined in claim 3 and further characterized by the formation of the tow bar as a pair of spaced tubular body members having interconnecting web frame sections therebetween, the said tubular frame members engaged one with the other at one end of the said tow bar and a coupling secured thereto for engagement with said coupler ball on said Y-shaped frame.

5. The trailer hitch defined in claim 3 and further characterized by a chain secured to the said tow bar and engageable with the said motor vehicle for temporarily supporting the said tow bar with respect thereto.

GEORGE C. MILLS.

REFERENCES CITED

The following references are of record in the file of this patent:

UNITED STATES PATENTS

| Number | Name | Date |
|---|---|---|
| 1,405,906 | Dyer | Feb. 7, 1922 |
| 2,238,095 | Almcrantz | Apr. 15, 1941 |
| 2,255,624 | Luse | Sept. 9, 1941 |
| 2,449,315 | Partin | Sept. 14, 1948 |